(12) United States Patent
Alves (10) Patent No.: US 10,625,768 B2
(45) Date of Patent: Apr. 21, 2020

(54) CRUMPLE ELEMENT FOR A SAFETY STEERING COLUMN

(71) Applicant: FORD GLOBAL TECHNOLOGIES, LLC, Dearborn, MI (US)

(72) Inventor: Bruno Alves, Huerth (DE)

(73) Assignee: Ford Global Technologies, LLC, Dearborn, MI (US)

(*) Notice: Subject to any disclaimer, the term of this patent is extended or adjusted under 35 U.S.C. 154(b) by 163 days.

(21) Appl. No.: 15/800,853

(22) Filed: Nov. 1, 2017

(65) Prior Publication Data

US 2018/0118250 A1 May 3, 2018

(30) Foreign Application Priority Data

Nov. 2, 2016 (DE) .................. 10 2016 221 461

(51) Int. Cl.
*B62D 1/19* (2006.01)

(52) U.S. Cl.
CPC .................. *B62D 1/192* (2013.01)

(58) Field of Classification Search
CPC .............. B62D 1/192; B62D 1/195
See application file for complete search history.

(56) References Cited

U.S. PATENT DOCUMENTS

| | | | | |
|---|---|---|---|---|
| 3,373,629 A | * | 3/1968 | Wight .................. | B62D 1/192 180/78 |
| 3,401,576 A | | 9/1968 | Eckels | |
| 3,461,740 A | | 8/1969 | Tajima et al. | |
| 3,487,710 A | * | 1/1970 | Fergle .................. | B62D 1/192 188/371 |
| 3,500,698 A | * | 3/1970 | Richter .................. | B62D 1/192 74/493 |
| 3,537,329 A | * | 11/1970 | Ravenel .................. | B62D 1/192 74/492 |
| 3,590,655 A | | 7/1971 | Farrell et al. | |

(Continued)

FOREIGN PATENT DOCUMENTS

| | | |
|---|---|---|
| EP | 0091671 A2 | 10/1983 |
| GB | 1125206 A | 8/1968 |

(Continued)

OTHER PUBLICATIONS

Krassenstein, Eddie. "Andreas Bastian Creates Incredible Bendable 3D Printed Mesostructured Material." Apr. 29, 2014.

*Primary Examiner* — Faye M Fleming
(74) *Attorney, Agent, or Firm* — Frank MacKenzie; Brooks Kushman P.C.

(57) ABSTRACT

The disclosure concerns a crumple element for a steering column. In order to provide a reliable, structurally simple steering column, according to the disclosure, it is provided that the crumple element has first and second connecting portions arranged axially at an end to connect adjacent steering column parts, and an interrupted crumple portion arranged in between the first and second connecting portions, and is able to deform by a threshold force acting axially, while the connecting portions are deformation-resistant to the threshold force. The crumple element is made integrally by additive production from metal. An end region of the first connecting portion facing the crumple portion has a first portion that protrudes axially relative to a second portion lying opposite the first portion transversely to the axial direction.

17 Claims, 4 Drawing Sheets

(56) References Cited

U.S. PATENT DOCUMENTS

| | | | | |
|---|---|---|---|---|
| 3,656,367 A * | 4/1972 | Wilfret | .................... | B62D 1/192 |
| | | | | 74/492 |
| 3,699,824 A * | 10/1972 | Staudenmayer | ....... | B62D 1/192 |
| | | | | 74/492 |
| 3,740,068 A | 6/1973 | Arata | | |
| 3,835,725 A | 9/1974 | Furusho et al. | | |
| 4,050,326 A * | 9/1977 | Kopf | ...................... | B62D 1/192 |
| | | | | 188/371 |
| 4,325,268 A * | 4/1982 | Benteler | ................ | F16F 7/123 |
| | | | | 188/371 |
| 4,411,167 A | 10/1983 | Mohr | | |
| 4,465,301 A | 8/1984 | Bongers et al. | | |
| 4,634,399 A | 1/1987 | Brunsch et al. | | |
| 5,342,091 A | 8/1994 | Hancock | | |
| 5,947,517 A * | 9/1999 | Ganser | ................... | B62D 1/192 |
| | | | | 280/777 |
| 7,644,951 B2 | 1/2010 | Fargeas et al. | | |
| 8,434,788 B2 * | 5/2013 | Becker | ................... | B62D 1/192 |
| | | | | 280/775 |
| 2006/0150763 A1 * | 7/2006 | Raabe | ..................... | B62D 1/16 |
| | | | | 74/492 |
| 2007/0046013 A1 * | 3/2007 | Bito | ...................... | B60R 21/203 |
| | | | | 280/777 |

FOREIGN PATENT DOCUMENTS

| | | | | |
|---|---|---|---|---|
| JP | 10067329 A * | 3/1998 | ............. | B62D 1/192 |
| JP | 2009056877 A * | 3/2009 | ............... | B62D 1/16 |
| WO | 2015053940 A1 | 4/2015 | | |
| WO | 2015164663 A1 | 10/2015 | | |

* cited by examiner

CRUMPLE ELEMENT FOR A SAFETY STEERING COLUMN

CROSS-REFERENCE TO RELATED APPLICATIONS

This application claims foreign priority benefits under 35 U.S.C. § 119(a)-(d) to DE Application 10 2016 221 461.6 filed Nov. 2, 2016, which is hereby incorporated by reference in its entirety.

TECHNICAL FIELD

The disclosure concerns a crumple element for a safety steering column.

BACKGROUND

Safety steering columns are used in motor vehicles to increase driver safety during frontal impacts. The safety steering column prevents parts of the steering column, and, in particular, a steering wheel from being pushed into a driver's compartment. To achieve this, various, generally passive mechanisms are known. One approach is to configure the steering column as a telescopic steering column. which a part of the steering column engages in another part of the steering column, and, if a predefined threshold force is exceeded, can be pushed telescopically therein, whereby the total length of the steering column is reduced. The two parts may for example be connected via a connecting element, which is designed to yield when the threshold force is exceeded.

Alternatively or additionally, crumple elements may be provided, which deform under a force above a threshold value, and are compressed in the longitudinal direction of the steering column. In this way, as well as an effective shortening of the steering column, energy absorption is achieved. While a corresponding crumple element should yield reliably under the effect of a sufficiently strong axial force, at the same time transmission of a torque within the steering column must be guaranteed. For this, either the crumple element must be sufficiently, torsionally rigid against torque, or torque must be transmitted via other components.

Modern safety steering columns are functionally effective, but often complex in construction, and consist of a plurality of interacting components. These increases cost and time for construction. Also, a high number of components and complexity make possible repairs to the steering column expensive and complicated.

EP 0 091 671 A2 discloses a safety steering column with a rigid steering column portion and a tubular part with a grid structure that yields on crushing of the steering column. The tubular part together with the steering column portion is made integrally from fiber-reinforced plastic. The grid structure may be formed in particular by webs that cross each other and run at an angle of 55° to a longitudinal axis of the tubular part.

U.S. Pat. No. 4,465,301 A discloses a safety steering column into which an approximately tubular safety element is inserted, which consists of mutually crossing strands of fiber-reinforced plastic and may for example have a round or octagonal cross-section. It is provided that the safety element is compressed in the longitudinal direction in an accident, while it resists torque on steering movements.

GB 1 125 206 A presents a safety steering column in which a generally tubular safety element with an interrupted structure of metal is provided. Here, either helical metal strips wound in opposing directions are welded together, or a tube is made from an interrupted plate. A similar safety column is disclosed in U.S. Pat. No. 3,500,698 A.

U.S. Pat. No. 4,634,399 A describes a component for transmitting torque between two shafts, e.g. inside a steering column. A grid-like sheath is arranged at a distance around a continuous core. The sheath is made of mutually crossing strands of fiber-reinforced plastic.

WO 2015/053940 A1 describes a component that may be used e.g. in aircraft or motor vehicles. To reduce stresses and achieve improved energy absorption, it is provided that the component is produced in an additive production process with an interrupted inner structure. This inner structure is produced integrally with the outer parts of the component.

WO 2015/164663 A1 discloses an energy-absorbing cell with a first structural element and a second structural element spaced from, and oriented parallel to, this. The structural elements are connected via intermediate elements that are arranged at an angle to each other. The energy absorption is primarily achieved by deformation of the intermediate elements. By repeating this cell structure, energy-absorbing parts of different sizes can be produced, in particular by additive production methods.

Also, in the prior art, various safety steering columns are known that are based on two telescopically intermeshing steering column parts, substantially in the manner of a telescopic steering column, whereby the telescoping of the two parts together deforms an energy-absorbing element.

Thus U.S. Pat. No. 3,401,576 A shows a safety steering column with two telescopically intermeshing parts that are surrounded as a whole by a sleeve of metal formed in a corrugated tube, which is compressed with energy absorption in an event of an accident.

U.S. Pat. No. 3,461,740 A describes a safety steering column with a coupling arrangement in which a first part, remote from the steering wheel, engages with a frustoconical end in a second part on the steering wheel side. If an axial force between the two parts exceeds a specific threshold value, the first part is pressed into the second part, deforming the latter, whereby the steering column is shortened.

U.S. Pat. No. 3,590,655 A discloses a safety steering column with different energy absorption units. In a first energy absorption unit, a plurality of balls is arranged between two cylindrical elements arranged concentrically to each other. In a second energy absorption unit, a cylindrical element has a grid-like interrupted portion that is constructed from mutually crossing strip portions.

U.S. Pat. No. 3,740,068 A presents a safety steering column in which two parts again intermesh telescopically, wherein an externally arranged energy absorption element is constructed from partially interrupted, angled sheet metal parts.

A safety steering column disclosed in U.S. Pat. No. 3,835,725 A comprises an upper and a lower portion, which intermesh telescopically, and are connected together via a concentrically arranged metal tube. When an axial force between the two portions exceeds a limit value, the metal tube is compressed and deforms, and the portions are pushed into each other.

U.S. Pat. No. 4,411,167 A presents a safety steering column in which two parts of the steering column are coupled together via a plurality of elements, partially intermesh telescopically and are connected together by plastic rods. When a specific axial force is exceeded, the respective plastic rod breaks off and the elements are pushed into each other. Finally, complete separation of the two parts from each other is also possible.

In a safety steering column disclosed in U.S. Pat. No. 7,644,951 B2, an inner tubular part engages in an outer tubular part. The inner tubular part has a widened portion at an axial distance from the outer tubular part. Between this portion and the outer tubular part, the inner tubular part is surrounded by a plastic tube that deforms when an axial force exceeds a threshold value, wherein the inner tubular part is pushed into the outer tubular part.

U.S. Pat. No. 5,342,091 A discloses a safety steering column in which a solid inner part engages in a tubular outer part. A pin is pushed through a transverse bore of the inner part and protrudes on both sides, supporting a tubular energy absorption element. If the inner part is pushed into the outer part, the energy absorption element comes into contact with the outer part and is stopped by this, wherein the pin is pushed to inside with deformation of the energy absorption element.

SUMMARY

In view of the outlined prior art, provision of a reliable, structurally simple safety steering column leaves room for improvements.

The disclosure is based on an object that provides a reliable, structurally-simple, safety steering column. In particular, a number of individual components should be kept as low as possible.

According to the disclosure, an object is achieved by a crumple element for a safety steering column.

It is pointed out, that the features and measures presented individually in the description that follows may be combined with each other in any technically sensible fashion, and indicate further embodiments of the disclosure. The description characterizes and specifies the disclosure further in connection with figures.

The disclosure provides a crumple element for a safety steering column. Instead of a crumple element, we could also call this a crash element or a safety element. Evidently, such a safety steering column is normally provided in a motor vehicle, in particular a car. As already discussed above, an aim of the safety steering column is to prevent parts of the steering column, or steering wheel, from being pushed into a driver's compartment on a frontal impact.

The crumple element has first and second connecting portions arranged axially at the end that connect to adjacent steering column parts, and an interrupted crumple portion arranged in between. The axial direction corresponds to an extension direction of the steering column in an assembled state, at least in a portion in which the crumple element is installed. The axial direction also defines radial and tangential directions mentioned below. The crumple element may, in portions, be formed so as to be at least approximately symmetrical to the axial direction. Normally, it has its greatest extension along the axial direction, or is elongated in the axial direction. The first and second connecting portions serve as connection to other parts of the steering column that, in the assembled state, adjoin the steering column on both sides in the axial direction. A corresponding connection may be achieved for example by bolting, wherein the corresponding connection portion may have an internal or external thread and support faces for a screwdriver or other tool. In general, at least one connecting portion may have a form-fit connection to an adjacent steering column part.

Whereas the connecting portions serve to connect other parts, the crumple portion lying between the connecting portions serves, in an accident, firstly to contribute to shortening the steering column, and secondly to absorb energy by deformation. For this reason, the crumple portion is deformable by an axially acting threshold force. The threshold force is an axially acting force corresponding to a predefined threshold value that is selected such that it is not exceeded in normal operation of the vehicle, but only on a frontal impact acting on the steering column. If an axially acting force exceeds the threshold value, the crumple portion is deformed. This deformation evidently includes the crumple portion being compressed in the axial direction. This is achieved in that the crumple portion is interrupted, i.e. has an interrupted structure with openings. The openings reduce the stiffness of the crumple portion in the axial direction such that, when the threshold force is reached or exceeded, it yields. In contrast, the connecting portions are normally predominantly, or completely, resistant to deformation under the threshold force, i.e. they do not deform when the threshold force is exceeded (or not in a relevant fashion).

According to the disclosure, the crumple element is made integrally by additive production from metal. The term "metal" here includes alloys that contain semi-metals or non-metals as well as metals. As part of additive production, normally metallic powder is applied in layers onto a base surface, melted in regions and hence bonded, whereby gradually the crumple element is formed. The layer thickness may be between 10 μm and 500 μm. The first layer is applied directly onto the base surface, whereupon the further layers are applied successively above each other. In particular, the powder may be bonded by selective laser melting (SLM) or by selective electron beam melting (SEBM). Evidently, the melting or beam effect follows a specific pattern. It could be said that a predefined area is heated or irradiated. It is possible that, for example, the area is scanned by a tightly focused beam, or that a specific radiation pattern is projected at a time. Evidently, the physical or temporal beam pattern may be controlled via predefined data (e.g. CAM data) of the crumple element to be produced. The irradiated area here corresponds to a (generally flat) cross-section of the object.

Such an additive production method may be used to produce almost any arbitrary three-dimensional form, so that it is possible to produce the above-mentioned three portions in one piece, wherein each of the portions can be optimized in relation to its function (reliable connection to other steering column parts or energy absorption), and at the same time, because of the integral production that corresponds to primary forming, a reliable connection between the portions is guaranteed. As will be explained below, in this way, advantageous forms can easily be produced, which for example could not be produced by casting or machining (with or without material removal) or only at disproportionately great cost. The crumple element may easily be bonded into the steering column by connecting the connecting portions to other parts, e.g. by bolting. Also, after an accident in which the crumple portion has been deformed, the crumple element can easily be exchanged since it is one single component. In principle, the entire safety function of the steering column can be achieved by the crumple element according to the disclosure, whereby the total number of parts required can be kept low. However, other parts of the steering column may also contribute to the safety function.

As well as compression of the crumple portion in the axial direction, it is also provided that the crumple portion folds or bends transversely to the axial direction. In this way, parts of the steering column may deflect laterally, which for safety reasons may under some circumstances have advantages over a simple compression. Such a folding may be initiated or influenced in particular by a configuration of the region that the crumple portion transforms into one of the connecting portions. Also, according to the disclosure, an end region of the first connecting portion facing the crumple portion has a first portion that protrudes axially relative to a second portion lying opposite to the first portion transversely to the axial direction. The end region could also be designated a transitional region from the first connecting portion to the crumple portion. It is, in any case, the region where the connecting region ends and the crumple portion adjoins. This end region is configured asymmetrically, wherein the first portion protrudes axially (and the crumple portion is recessed axially accordingly), namely in comparison with the second portion, which lies opposite the first portion transversely to the axial direction. Insofar as an axially running center axis of the first connecting portion or of the entire crumple element can be defined, the first and second portions lie opposite each other relative to this center axis. As a result of this configuration, on axial crushing of the crumple portion, a part assigned to the first portion is compressed fully at an earlier time than a part assigned to the second portion. In other words, the compression and hence the active return force from the crumple portion are asymmetric. This in turn leads to the crumple portion folding or bending, namely in the direction of the side of the second portion.

Protrusion of the first portion described above may be achieved in various ways, e.g. in steps. This means that either only the two above-mentioned portions, or also further portions lying in between, may protrude by different distances in the axial direction in steps. According to another preferred embodiment, an end portion has an end face running towards the crumple portion obliquely to the axial direction. Here, instead of the term "end face", the term "transitional face" could be used, which marks a transition from the first connecting portion to the crumple portion. In other words, at least parts of the end face do not correspond to a physical surface, since the crumple portion adjoins directly and integrally there. Said end face runs obliquely to the axial direction (i.e. neither parallel nor orthogonal thereto), whereby automatically—as described above—an asymmetrically protruding first portion results. The end face may here in particular be formed as a plane, although it is conceivable that it is curved or angled.

In order to effectively initiate folding of the crumple portion described above, an angle to the axial direction should not be too large (i.e. not too close to 90°), since in this case the first region would only protrude slightly. Also, too small an angle is not generally advantageous. According to an advantageous embodiment, the end face runs at an angle of between 20° and 70°, preferably between 40° and 50°, to the axial direction. In particular, the angle may be approximately 45°, i.e. between 43° and 47°, or between 44° and 46°, preferably precisely 45°.

As already outlined above, because of the additive production, the individual portions may be configured independently from each other in almost arbitrary fashion. In one embodiment, a radial outer dimension of at least one of the connecting portions is larger than a radial outer dimension of the crumple portion. Here, the term "radial outer dimension" means a maximum extension in the radial direction. In the case of a cylindrical element, this would, e.g., be the outer radius. It could also be said that the respective connecting portion projects radially over the crumple portion or protrudes relative to this. Such a dimensioning may, e.g., serve to make the connecting portion more stable than the crumple portion. This may prevent the crumple portion, if deformed greatly, from moving laterally (i.e. transversely to the axial direction) past the respective connecting portion. This could be disadvantageous in that the further deformation of the crumple portion would be difficult to control by the connecting portions.

Normally, it is preferred that the connecting portions are configured to be as stable as possible and, to this extent, in contrast to the crumple portion, they must also not be interrupted. However, each of the connecting portions may have a recess lying radially on the inside that serves to receive a portion of another steering column part. In this case, an inside of the recess may comprise a form-fit connection, e.g. an internal thread. Irrespective of this, it is preferred that at least one of the connecting portions has a sheath that is closed tangentially and axially. The sheath may at least in portions have the form of a cylinder casing, wherein—as stated above—flat support faces for a screwdriver or similar may be provided.

Preferably, the crumple portion has a grid-like sheath that surrounds an axial passage opening lying radially on the inside. Said opening passes through the crumple portion but not necessarily through the adjacent connecting portions. If an above-mentioned recess of a connecting portion is formed continuously, it is however connected to an opening of the crumple portion. The sheath may in particular be formed as a cylinder casing, whereby it can be described by an inner and an outer cylindrical face. The sheath is grid-like, i.e. it has a plurality of passage openings in the radial direction.

According to one embodiment, the sheath has a plurality of mutually crossing strip portions running obliquely to a tangential direction. Evidently, openings are formed between the strip portions, i.e. the strip portions are spaced from each other in portions. They run obliquely to the tangential direction, i.e. their direction also has an axial component. In particular, the strip portions may be formed so as to be helical, wherein a first group of strip portions runs along the sheath, twisting towards the right, and a second group, which forms crossing regions with the first group, runs twisting towards the left. The metal in the crossing regions may under certain circumstances not be clearly assigned to a specific strip portion, insofar as two strip portions transform seamlessly into each other because of the integral production. Depending on viewpoint, instead of strip portions running several times around and crossing each other, a correspondingly greater number of shorter strip portions could be considered that each run only from one crossing region to the next. As a whole, a grid-like structure results that behaves torsionally, stiffly under axial torque (wherein the vector of the torque is oriented axially) but can be compressed reliably under an axially acting threshold force. Also, a folding as described above can be achieved with this structure.

The angle of the strip portions to the tangential direction may in principle assume different values, and may for example lie between 5° and 80°, wherein the angle need not be the same for all strip portions. In particular, at least some of the strip portions may run at an angle of maximum 20° to the tangential direction. In relation to a helical path, this therefore corresponds to a relatively steep pitch. This reinforces torsional stiffness under axial torque, but also the crumple portion is easier to crush in the axial direction.

Despite this, a bending stiffness can be achieved that is sufficiently low to allow the folding mentioned above.

Under an aspect of increased torsional stiffness, it is also preferred that in at least some of the strip portions, a radial thickness is greater than an axial thickness. In other words, the corresponding strip portions are formed thicker in the radial direction than in the axial direction. The corresponding strip portions could also be described as more or less flattened. This could also be described as a rib-like structure of the strip portions. Evidently, this increases the torsional stiffness without increasing the stiffness against axial forces in a similar fashion. Also, the bending stiffness can in this way be kept sufficiently low to allow folding of the crumple portion. It is pointed out that this configuration, in particular in connection with the small angle of the strip portions to the tangential direction described above, can scarcely be achieved integrally without additive production.

Further advantageous details and effects of the disclosure are explained in more detail below with reference to an exemplary embodiment shown in the figures. The drawings show:

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In the various figures, the same parts always carry the same reference numerals so these are usually only described once.

Figure 1:
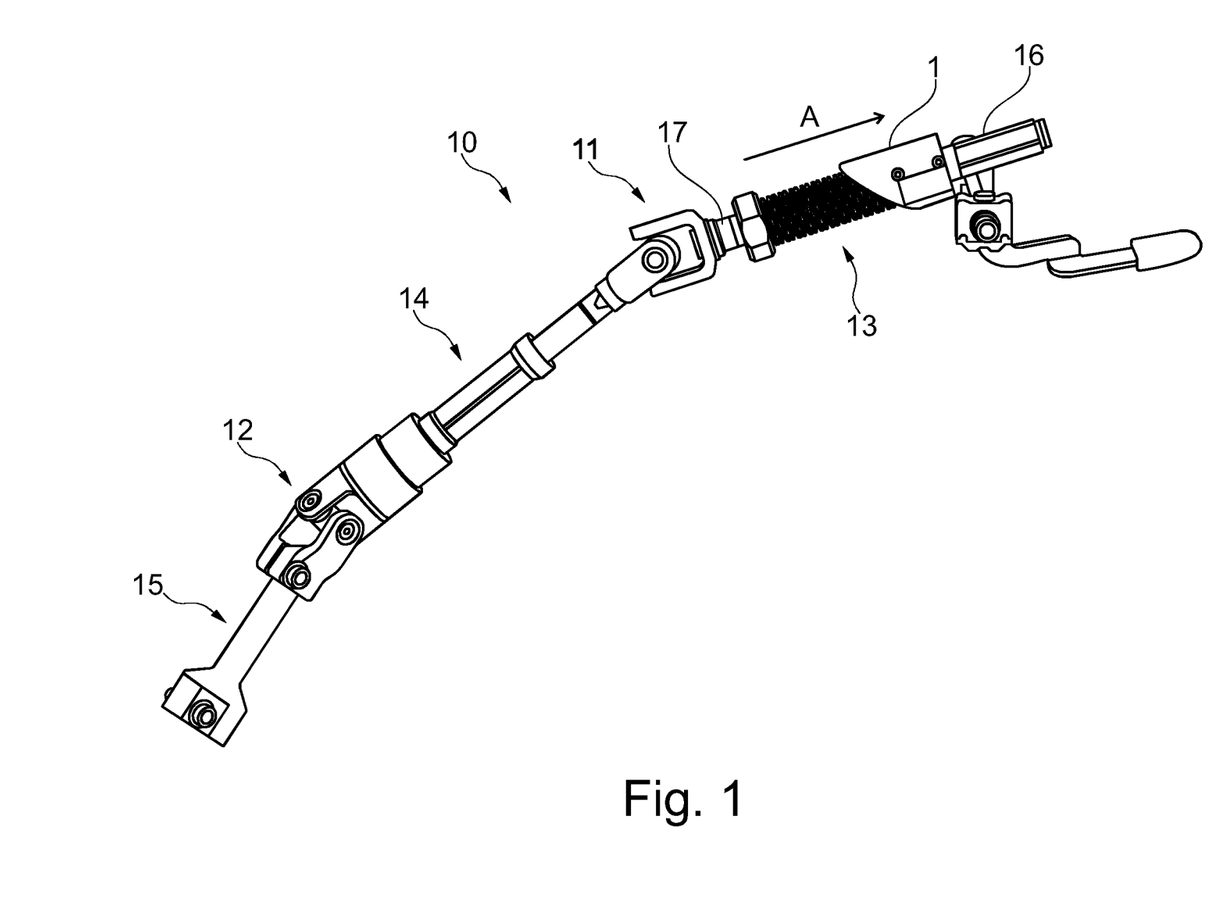
FIG. 1 shows a perspective depiction of a safety steering column with a crumple element according to the disclosure.
Figure 2:
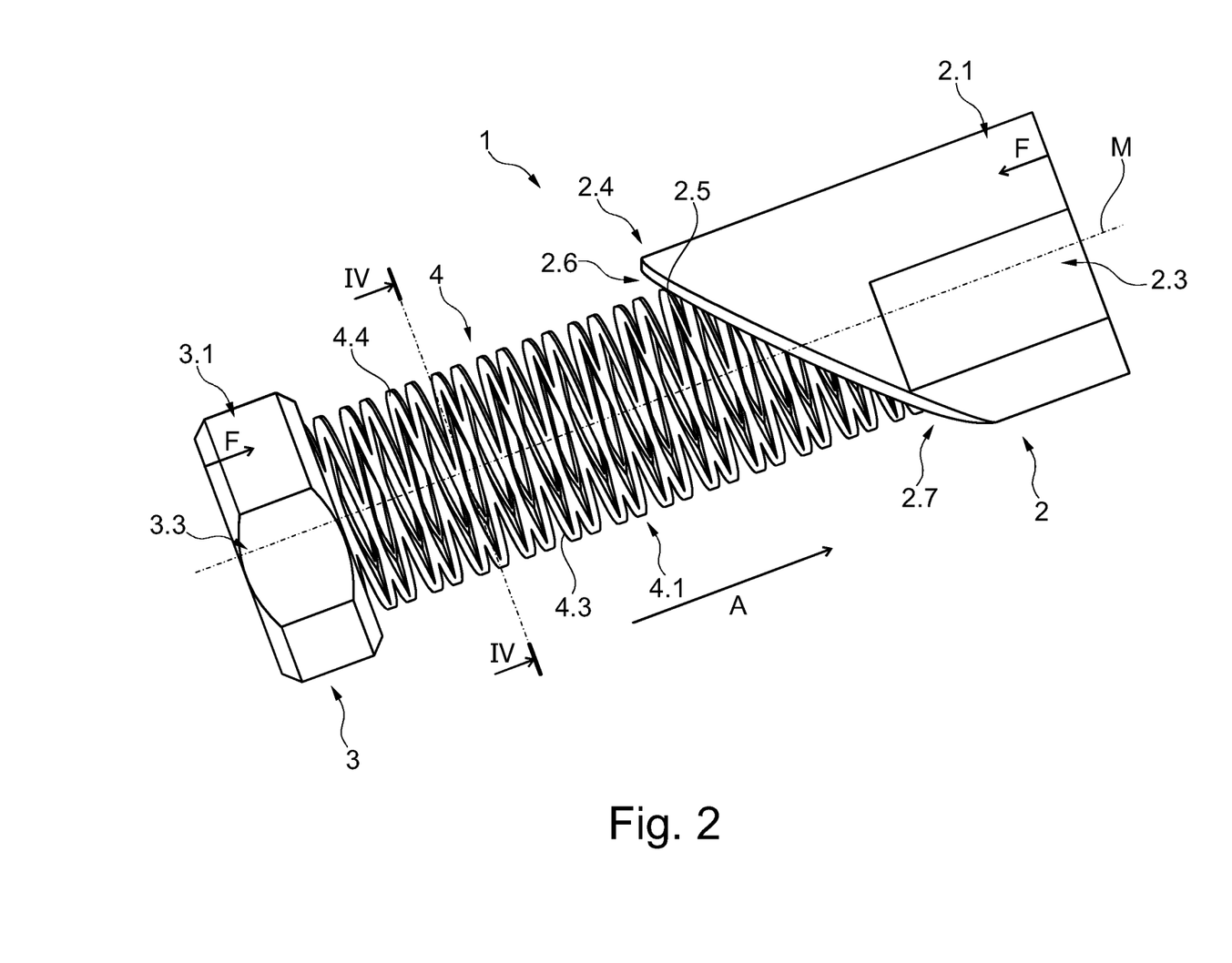
FIG. 2 shows a perspective depiction of the crumple element from FIG. 1.
Figure 5:
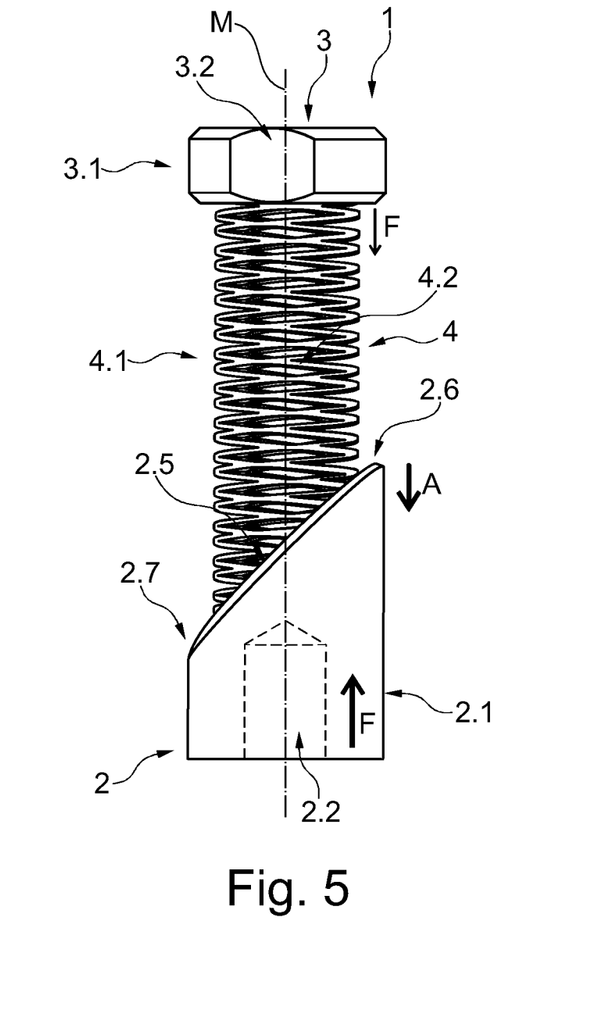
FIG. 5 shows a sectional depiction along line V-V in FIG. 4.
Figure 6:
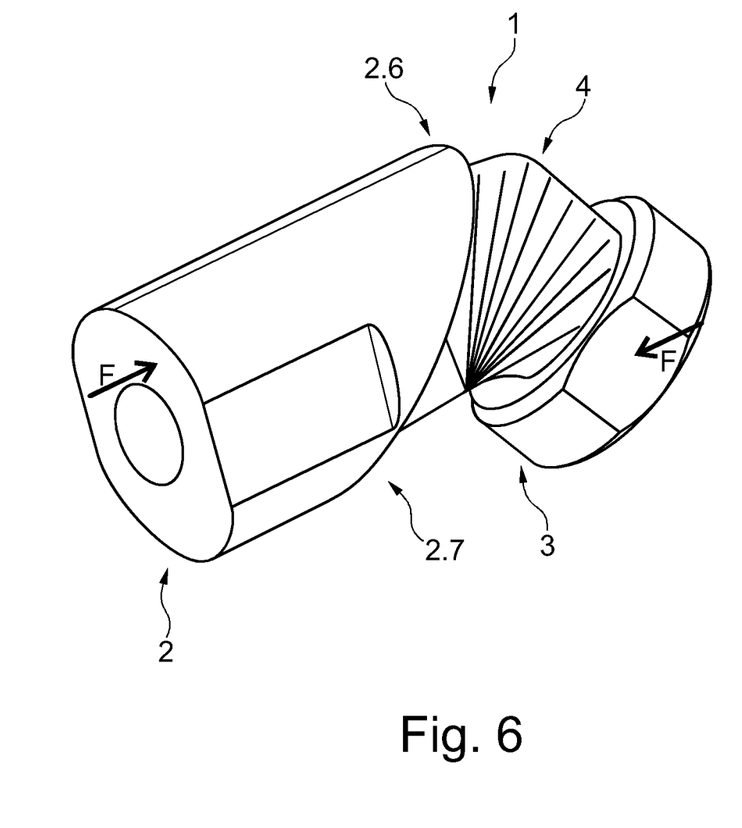
FIG. 6 shows a perspective depiction of the crumple element from FIGS. 1-5 in a deformed state.

FIG. 1 shows a perspective depiction of a safety steering column 10 for a car. The steering column is formed as an angled steering column with two universal joints 11, 12. With regard to the two universal joints 11, 12, the safety steering column 10 may be divided into three steering column portions 13, 14, 15 that remain rigid during normal operation of the vehicle. A crumple element 1 is arranged in a first steering column portion 13 and extends along an axial direction A. The first steering column portion 13 is configured such that, on a frontal impact, it is crushed, and folds in order to prevent penetration of parts of the safety steering column 10 into a driver's compartment of the car. The crushing and folding are initiated when an axially acting threshold force F (more precisely, a pair of forces as shown in FIGS. 2, 5 and 6) acts on the crumple element 1 and a crumple portion 4. The crumple element 1 is connected, preferably bolted, to adjacent steering column parts 16, 17.

FIG. 2 shows the crumple element 1 in perspective view. As a whole, the crumple element includes a first connecting portion 2, a second connecting portion 3 and the crumple portion 4, which is arranged between the first and second connecting portions 2, 3 in the axial direction A. The crumple element 1 with the first, second, and crumple portions 2, 3, 4 is made integrally from metal, for example by selective laser melting (SLM). It is constructed predominantly symmetrically to an axially running center axis M. The first and second connecting portions 2, 3 are largely solid and, as evident from the sectional depiction in FIG. 5, each have only a respective inner recess 2.2, 2.3 that has an internal thread (not shown). In assembled state, the respective internal thread engages with corresponding external threads of the adjacent steering column parts 16, 17. To facilitate bolting, flat support faces 2.3, 3.3 to enable a screwdriver are provided on a tangentially and axially closed sheath 2.1 of the first connecting portion 2, and on an also closed sheath 3.1 of the second connecting portion 3. Apart from this, the sheaths 2.1, 3.1 are formed cylindrically. Whereas the first and second connecting portions 2, 3 are thus predominantly closed as a whole and formed solid, the crumple portion 4 lying in between the first and second connecting portions is formed so as to be interrupted. The crumple portion 4 is roughly cylindrical in shape, wherein its outer diameter is smaller than that of the first and second connecting portions 2, 3. The crumple portion 4 has a sheath 4.1 that surrounds an inner passage opening 4.2 in the axial direction A.

Figure 3:
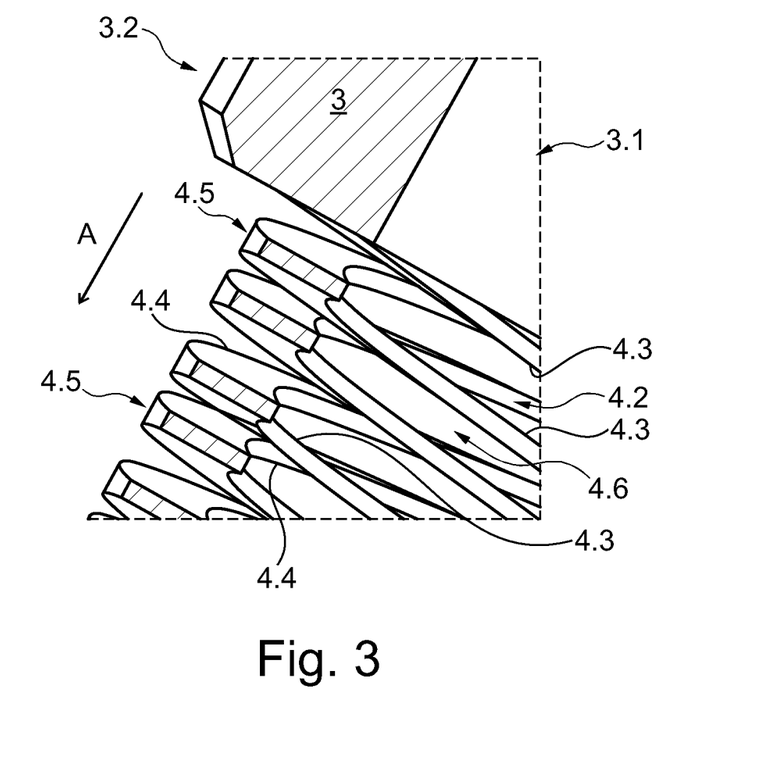
FIG. 3 shows a sectional depiction of a part of the crumple element from FIG. 2.
Figure 4:
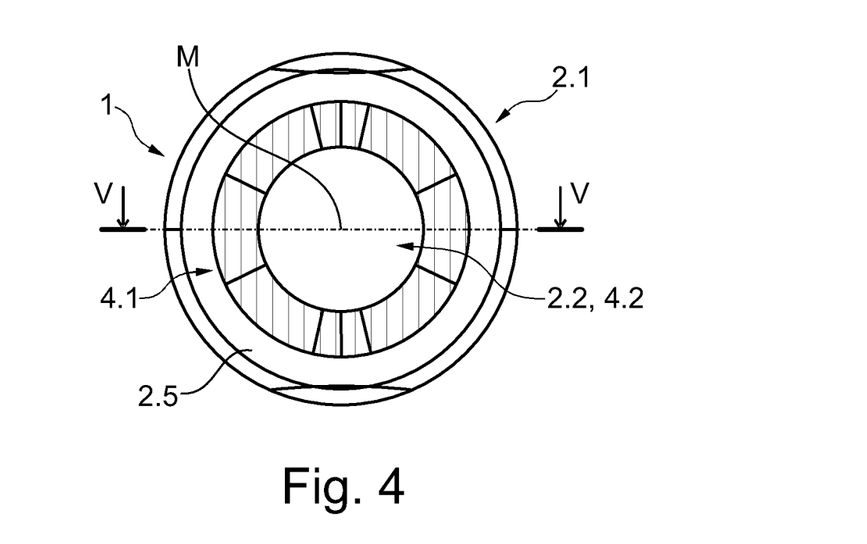
FIG. 4 shows a sectional depiction along line IV-IV in FIG. 2.

The structure of the crumple sheath 4.1, which is evident in particular in the detailed view of FIG. 3, may be characterized as grid-like. The crumple sheath 4.1 has a plurality of strip portions 4.3, 4.4 that, as a whole, run helically. A first group of strip portions 4.3 runs twisting to the right at a slope angle of approximately +15° to a tangential direction (or 75° to the axial direction A), whereas the second group of strip portions 4.4 runs twisting to the left with a slope angle of approximately 15° to the tangential direction. The strip portions 4.3, 4.4 of the first and second groups intersect repeatedly in crossing regions 4.5, and thus form a cohesive grid-like structure. FIG. 3 shows separating lines between the strip portions 4.3, 4.4 in crossing regions, which however merely indicate their course. Because of the integral production, no physical separation exists there.

Connection of the strip portions 4.3, 4.4 also contributes to substantial torsional stiffness of the crumple portion 4 under the axial torques that occur during steering. This is reinforced further by the comparatively low slope angle relative to the tangential direction, and—as clearly evident in FIG. 3—by a radial thickness of each strip portion 4.3, 4.4 being significantly greater than an axial thickness. Due to the comparatively small axial thickness of the strip portions 4.3, 4.4, and intermediate spaces 4.6 present between them, the crumple portion 4 can be crushed by the axially acting threshold force F that is exceeded on a frontal impact.

In order to achieve a folding of the crumple portion 4 in addition to the axial crushing, an end region 2.4 of the first connecting portion 2 facing the crumple portion 4 has an end face 2.5 running obliquely to the axial direction A. In the present example, the end face 2.5 runs at an angle of 45° to the axial direction A. Thus, the end region 2.4 has a first portion 2.6 that protrudes axially relative to a second portion 2.7 that lies transversely opposite the first portion 2.6 to the axial direction A. It could be said that the first and second portions 2.6, 2.7 lie opposite each other relative to the center axis M.

In a case of an axially acting force F, the crumple portion 4 is initially crushed approximately symmetrically, but above a specific point, the crushing approaches a possible maximum value on a side of the first portion 2.6, while this is not yet the case on a side of the second portion 2.7. Because of the resulting asymmetric return forces, in cooperation with the oblique end face 2.5, a bending moment occurs on the crumple portion 4 that leads to folding in the direction of the second portion 2.7. A corresponding state is shown in FIG. 6. When viewed in conjunction with FIG. 1, it is clear that as a result, not only the crumple element 1, but also the adjacent steering column parts 16, 17 can deflect laterally i.e. transversely to the axial direction A. This, together with the crushing of the crumple portion 4, which causes an effective shortening of the first steering column portion 11, constitutes an additional mechanism with which penetration of the safety steering column 10 into the driver's compartment can be prevented.

A crumple element 1 deformed as shown in FIG. 6 may easily be replaced by releasing the bolt connections to the steering column parts 16, 17.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A crumple element for a safety steering column comprising:
   connecting portions arranged axially, one of the connecting portions arranged at an end region such that a first portion lies transversely opposite and protrudes relative to a second portion in an axial direction to connect adjacent steering column parts; and
   a crumple portion formed integrally via additive metal processing and arranged between the connecting portions such that, in response to an axially acting threshold force, the crumple portion is deformed, wherein the end region faces the crumple portion at an end face, wherein one of the connecting portions defines a radial outer dimension being larger than a radial outer dimension of the crumple portion.

2. The crumple element as claimed in claim 1, wherein the end face runs obliquely to the axial direction towards the crumple portion.

3. The crumple element as claimed in claim 2, wherein the end face runs obliquely at an angle between 20° and 70° to the axial direction.

4. The crumple element as claimed in claim 2, wherein the end face runs obliquely at an angle between 40° and 50° to the axial direction.

5. The crumple element as claimed in claim 1, wherein one of the connecting portions has a sheath closed tangentially and axially to the axial direction.

6. The crumple element as claimed in claim 1, wherein the crumple portion has a grid-like sheath that surrounds an axial passage opening lying radially on an inside of the crumple portion.

7. The crumple element as claimed in claim 6, wherein the sheath of the crumple portion has a plurality of mutually-crossing strip portions running obliquely to a tangential direction.

8. The crumple element as claimed in claim 7, wherein at least some of the strip portions run at a maximum angle of 20° to the tangential direction.

9. The crumple element as claimed in claim 7, wherein at least some of the strip portions define a radial thickness greater than an axial thickness.

10. A steering column comprising:
    connecting portions arranged axially, one of the connecting portions arranged at an end region such that a first portion lies transversely opposite, and protrudes relative to a second portion in an axial direction; and
    a crumple element arranged between the connecting portions, and having a crumple portion that, in response to an axially acting threshold force, deforms at an end face such that the end region faces the crumple portion at the end face, wherein the crumple portion has a grid-like sheath that surrounds an axial passage opening lying radially on an inside of the crumple portion, the sheath having a plurality of mutually-crossing strip portions that run obliquely to a tangential direction.

11. The steering column as claimed in claim 10, wherein the end face runs obliquely to the axial direction towards the crumple portion at an angle between 40° and 50° degrees to the axial direction.

12. The steering column as claimed in claim 10, wherein at least some of the strip portions run at a maximum angle of 20° to the tangential direction.

13. The steering column as claimed in claim 10, wherein at least some of the strip portions define a radial thickness greater than an axial thickness.

14. A vehicle comprising:
    connecting portions arranged axially, one of the connecting portions arranged at an end region such that a first portion lies transversely opposite, and protrudes relative to a second portion in an axial direction; and
    a crumple element arranged between the connecting portions, and having a crumple portion that, in response to an axially acting threshold force, deforms at an end face such that the end region faces the crumple portion at the end face, wherein the crumple portion has a grid-like sheath that surrounds an axial passage opening lying radially on an inside of the crumple portion, the sheath having a plurality of mutually-crossing strip portions that run obliquely to a tangential direction.

15. The vehicle as claimed in claim 14, wherein the end face runs obliquely to the axial direction towards the crumple portion at an angle between 40° and 50° degrees to the axial direction.

16. The vehicle as claimed in claim 14, wherein at least some of the strip portions run at a maximum angle of 20° to the tangential direction.

17. The vehicle as claimed in claim 14, wherein at least some of the strip portions define a radial thickness greater than an axial thickness.

* * * * *